Figure 1:
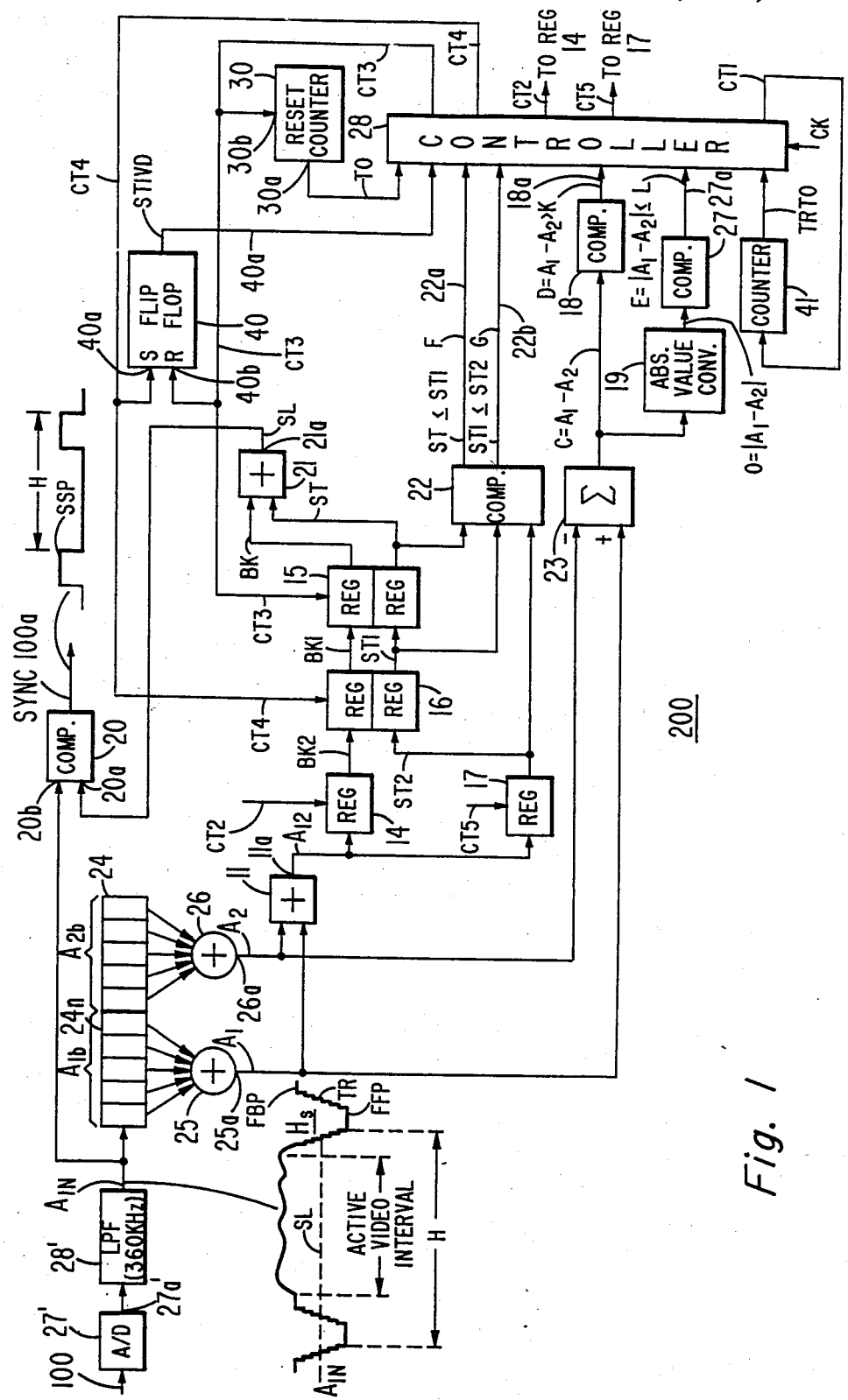

United States Patent [19]

Balaban et al.

[11] Patent Number: 4,698,679
[45] Date of Patent: Oct. 6, 1987

[54] SYNC SEPARATOR

[75] Inventors: Alvin R. Balaban, Lebanon; Steven A. Steckler, Clark, both of N.J.

[73] Assignee: RCA Corporation, Princeton, N.J.

[21] Appl. No.: 857,331

[22] Filed: Apr. 30, 1986

[51] Int. Cl.$^4$ .......................... H04N 5/08; H04N 5/10
[52] U.S. Cl. ..................................... 358/153; 328/139
[58] Field of Search ............... 358/148, 153, 155, 156, 358/158; 328/108, 114, 115, 135, 137, 139

[56] References Cited

U.S. PATENT DOCUMENTS

| | | | | |
|---|---|---|---|---|
| 3,706,847 | 12/1972 | Smeulers | ............................. | 358/153 |
| 4,185,299 | 1/1980 | Harford | ............................... | 358/153 |
| 4,621,289 | 11/1986 | Bart et al. | ............................ | 358/153 |

FOREIGN PATENT DOCUMENTS 0186270 10/1983 Japan .................................. 358/153
59-23971 2/1984 Japan .

*Primary Examiner*—Howard W. Britton
*Assistant Examiner*—Michael D. Parker
*Attorney, Agent, or Firm*—Eugene M. Whitacre; Joseph J. Laks; Sammy S. Henig

[57] ABSTRACT

A sync separator detects, in a corresponding part of the waveform of a video signal, the occurrence of the trailing edge of a corresponding sync pulse, in accordance with the rate of change of the video signal. Information obtained from the sync tip and the back porch portions of the corresponding sync pulse is used for generating a slice level signal. A comparator responsive to the slice level signal separates a sync signal from the video signal.

21 Claims, 6 Drawing Figures

SYNC SEPARATOR

The invention relates to circuits for separating synchronization signals from a composite video signal.

In a television receiver, an incoming NTSC television signal is coupled via IF stages to a video detector that generates a corresponding NTSC baseband composite video signal. In order to separate the horizontal and vertical sync signals from the composite video signal, a voltage level that is sometimes referred to as the slice, or slicing level signal is established. Typically, the slicing level signal is established at a level that is between the expected level of the tip portion, or peak, of a given sync pulse and the back porch portion of such sync pulse. When the magnitude of the composite video signal, for example, exceeds that of the slicing level signal, such as during the occurrence of the tip portion of the given sync pulse, an output signal that is the separated sync signal is generated. On the other hand, when the magnitude of the composite video signal is lower than that of the slicing level signal, such as, for example, during an active video portion of a given video line signal of the composite video signal, such output signal is not generated.

Typically, the signal gain of the IF stages that provide the input signal to the video detector is controlled in an automatic gain control (AGC) loop using feedback. In order to obtain noise immunity the slicing level is established at, for example, the mid-range level that is between the expected levels of the tip and the back porch portions, respectively. In some prior art circuits the AGC loop tends to maintain the level of the tip or the back porch portions at a substantially constant predetermined level, provided some conditions are met. The first of such conditions may be that the amplitude of the incoming television signal remains within the regulating range of the AGC loop. The second of such conditions may be that transient variations in the levels of the sync tip and back porch portions that occur from one sync pulse to the next one are small such that the AGC loop, which normally has a slow transient response time, can track such changes. Transient variations in the composite video signal may occur, for example, when a television receiver is tuned to a different television channel. Such transient variations may also occur as a result of, for example, airplane induced flutter in the incoming television signal or as a result of other types of external noise signals accompanying the incoming television signal.

It may be desirable to adjust the level of the slicing level signal dynamically and automatically so that it remains at, for example, mid range between the level of the tip portion and that of the back porch portion of a given sync pulse even when the AGC loop is not capable of properly tracking the level of the tip portion.

In some prior art circuits, varying sync pulse widths due to standard and nonstandard incoming signals may establish different slicing levels. The pictures displayed with different slice levels, if not compensated, would be spacially shifted.

In accordance with an aspect of the invention, a sync separator detects, in a part of the waveform of a composite video signal, the occurrence of a predetermined waveform pattern. After such pattern is recognized, information obtained from the part of the waveform that includes such pattern is used for generating a slice level signal. The slice level signal is used for separating a sync signal from the composite video signal.

In carrying out an aspect of the invention, the pattern is recognized by detecting, in the waveform of the composite video signal, the occurrence of, for example, a sequence of a substantially flat first portion, followed by a transition portion that is then followed by a substantially flat second portion. Such a sequence may correspond with a trailing edge of a valid sync pulse of the composite video signal. After such pattern is recognized, the information of the levels of the first and second portions, respectively, is processed for generating the slice level signal. The slice level signal is automatically established to be at a level that is, for example, at the mid-range between the level of the flat first portion and that of the second flat portion.

The detection of the sequence of the first portion, transition, and second portion in the waveform of the composite video signal provides information for generating and updating the slice level signal. The slice level signal may be updated within, for example, a horizontal interval that follows the trailing edge of the sync pulse. Advantageously, the slice level signal is capable of tracking the levels of the tip and the back porch portions of the sync pulse, respectively, such that during the occurrence of a transient condition in the AGC loop or when the incoming television signal is at an amplitude that is outside the correction range of the AGC loop, proper sync separation is maintained.

In accordance with another aspect of the invention, a sync separator apparatus responsive to a composite video signal that contains synchronizing and picture information generates from the video signal a synchronizing output signal that contains the synchronizing information. The rate of change in the video signal is detected for generating a first signal that is indicative of the rate of change occurring in the composite video signal. A second signal that is indicative of the occurrence of a first predetermined rate of change in the video signal is generated. The synchronizing output signal is generated in accordance with the composite video signal and the second signal.

Figure 2:
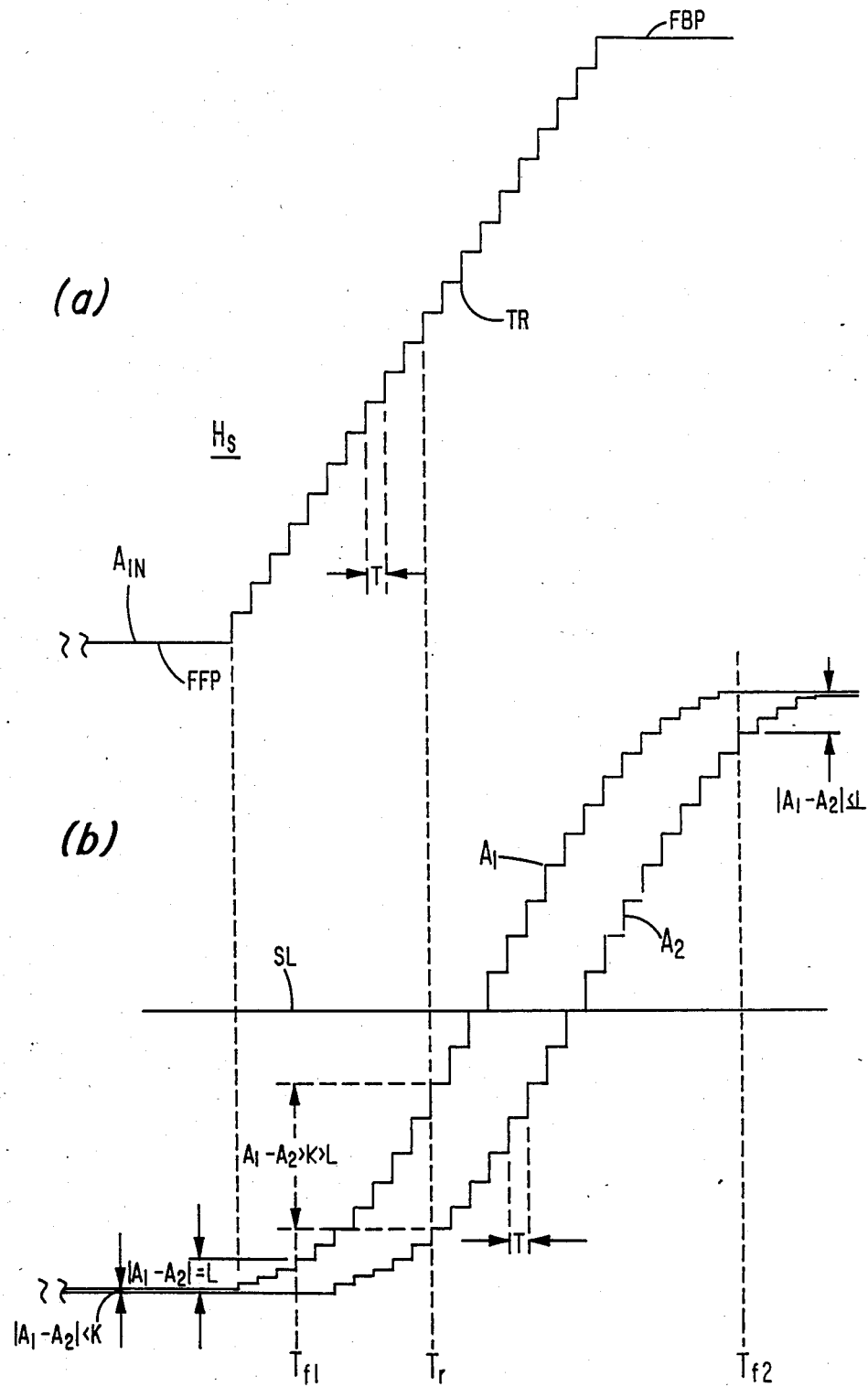
Figure 3:
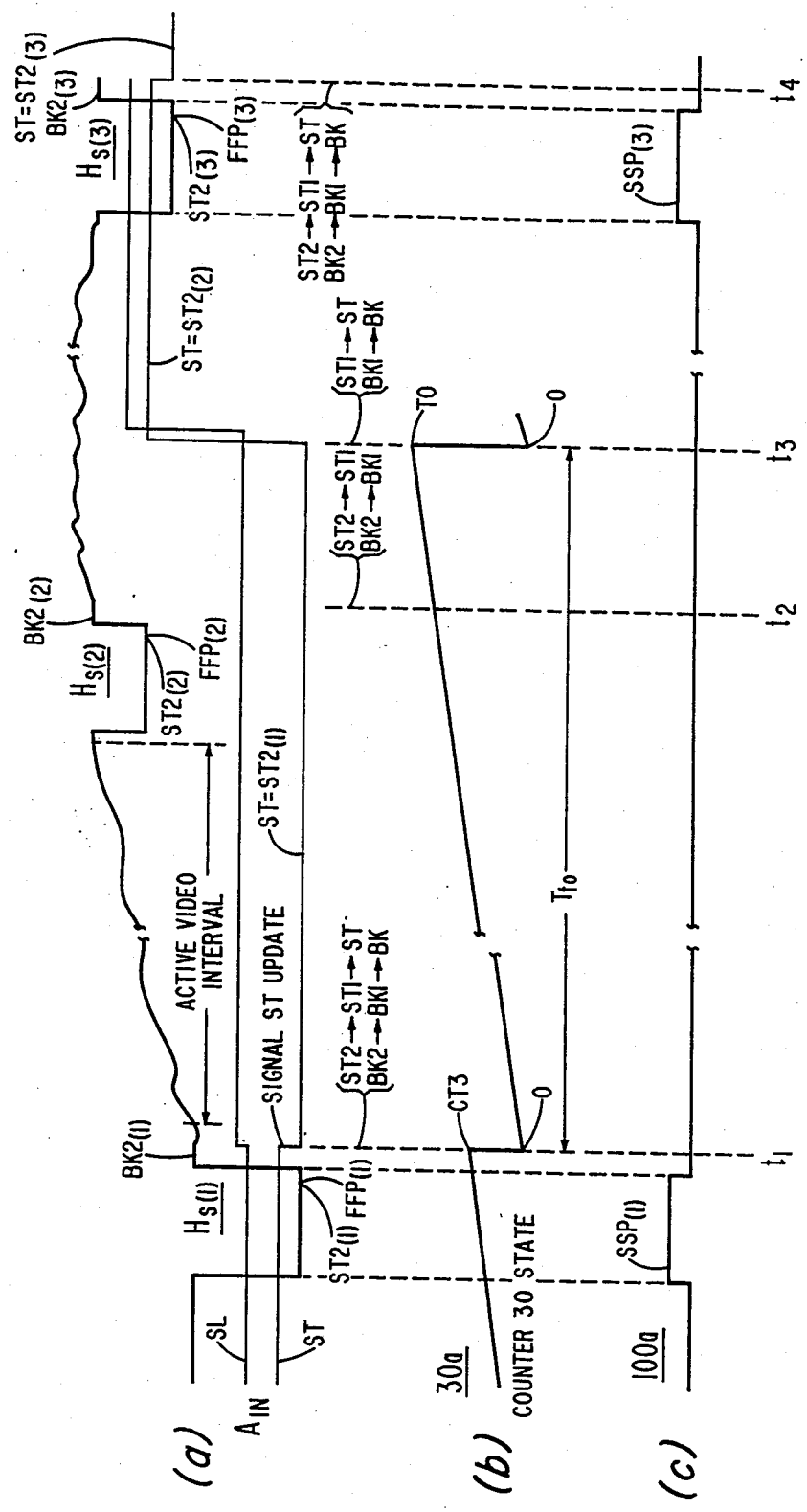

FIG. 1 illustrates a sync separator embodying an aspect of the invention;

FIG. 2,a–b illustrate waveforms related to the trailing edge of a sync pulse that are useful in explaining sync pattern recognition operation of the sync separator of FIG. 1; and FIG. 3,a–c illustrate waveforms useful in explaining the operation of the sync separator of FIG. 1 immediately after a sync pattern is recognized.

FIG. 1 illustrates a sync separator 200 embodying an aspect of the invention. An analog, baseband composite video signal 100 such as, for example, defined in an NTSC standard, is obtained at an output terminal of, for example, a video detector of a television receiver, not shown in FIG. 1. Analog signal 100 is sampled and then converted to a digital word in an analog-to-digital converter 27' at a rate 1/T that meets the Nyquist sampling criteria, where T is the interval between successive sampling cycles. The rate 1/T is equal, illustratively, to 14.32 MHz, four times the color subcarrier frequency of an NTSC signal. The digitized signal is low-pass filtered in a digital low-pass filter 28' to generate a signal $A_{IN}$. Signal $A_{IN}$ is coupled to an input port IN of a shift register 24.

The trailing edge of a given sync pulse $H_s$ of signal $A_{IN}$ includes a flat portion FFP that corresponds with the tip portion of sync pulse $H_s$, a transition portion TR and a flat portion FBP that corresponds with the back porch portion of pulse $H_s$. Portion FFP is, illustratively, at a value that is lower, or less positive, than that of portion FBP.

Sync separator 200 stores values representative of portions FFP and FBP, respectively, of a given sync pulse $H_s$ to provide, in a manner to be described later, a sync tip signal ST and a back porch signal BK, respectively, that are coupled to corresponding input ports of a summer 21. A slice level signal SL that is produced at an output terminal 21a of summer 21 contains the average value of signals ST and BK. Slice level signal SL having a value that is, illustratively, in the mid-range between the levels of tip portion FFP and the back porch portion FBP of sync pulse $H_s$ is coupled to an input terminal 20a of a digital comparator 20. Signal $A_{IN}$ is coupled to an input terminal 20b of comparator 20. Comparator 20 generates a separated sync signal 100a when signal $A_{IN}$ has a value that is, illustratively, lower than that of slice level signal SL. Thus, signal 100a contains the separated sync signals that correspond with sync pulses $H_S$ of signal $A_{IN}$.

Frequency components at an output terminal 27a' of analog-to-digital converter 27' that are higher than the filter cutoff frequency that is between 360 KHz and 500 KHz are substantially reduced in signal $A_{IN}$ by low-pass filter 28'. The words of signal $A_{IN}$ are sequentially shifted into shift register 24 at the rate 1/T. Each storage cell 24n of shift register 24 is capable of storing a corresponding digital word of signal $A_{IN}$.

A group $A_{1b}$ of, illustratively, five consecutively shifted-in words of signal $A_{IN}$, that are shifted, or stored, in register 24, are coupled to corresponding input ports of a summer 25 that generates at an output port 25a a signal $A_1$ that contains in each period T a correspondent word that provides a running average of the five digital words of group $A_{1b}$. Similarly, a group $A_{2b}$ of, illustratively, five consecutively stored words of signal $A_{IN}$ is coupled to corresponding input ports of a summer 26 that generates a signal $A_2$ that provides a running average of the five words of group $A_{2b}$ that are stored immediately before the five words of group $A_{1b}$. Thus, signal $A_1$ provides the running average of a corresponding portion of signal $A_{IN}$. Likewise, signal $A_2$ provides, after a delay interval that is equal to 5T, the running average of signal $A_{IN}$. Each of signals $A_1$ and $A_2$ represents signal $A_{IN}$ that is low-pass filtered by this five point averaging process. It should be understood that groups $A_{1b}$ and $A_{2b}$ may include, if desired, common, or overlapping, ones of the storage cells 24n of register 24.

Signals $A_1$ and $A_2$ are coupled to corresponding input ports of a summer 11 that generates a sum, or average, signal $A_{12}$ at an output port 11a. Signal $A_2$ is subtracted from signal $A_1$ in a subtracter 23 to form a difference signal C. Difference signal C is coupled to an input port of a comparator 18 that generates a signal D on a line 18a when signal C, that is equal to the value of signal $A_1$ minus the value of signal $A_2$, is greater than a predetermined positive value K. Signal C is also coupled to an input port of an absolute value converter 19 that generates a signal 0 that is equal to the absolute value of signal C. A comparator 27 generates a signal E on a line 27a when signal 0 is smaller than or equal to a predetermined positive value L that is substantially smaller than K. Signals C, D and E are indicative of the rate of change of signal $A_{IN}$. Signals D and E are coupled to a controller 28 that performs the control functions of separator 200, in accordance with, for example, signals D and E. When the rate of change of signal $A_{IN}$ is small, corresponding to a flat portion of signal $A_{IN}$, signal E is generated. When the rate of change of signal $A_{IN}$ is positive and large, corresponding with, for example, the trailing edge TR of sync pulse $H_s$, signal D is generated.

Controller 28 may be constructed using conventional control logic. For example, controller 28 may include a logic sequencer or microcomputer operating in accordance with microinstructions of a microprogram that is stored in a read only memory, not shown in FIG. 1 and that performs the procedure described below.

In accordance with an aspect of the invention, during operation in a search mode, controller 28 searches for and recognizes in the waveform of signal $A_{IN}$, a predetermined waveform pattern occurring in a corresponding part of signal $A_{IN}$ by detecting the occurrence of a predetermined rate of change of signal $A_{IN}$. The waveform pattern, that occurs in the corresponding part of signal $A_{IN}$, may be indicative of the occurrence of the trailing edge of a given sync pulse $H_s$.

During a first step of the operation in the search mode, controller 28 generates a clock signal CT5 and a clock signal CT2. Each signal CT5 and CT2 occurs at a rate of, illustratively, 1/T. Sum signal $A_{12}$ that provides the average value of signals $A_1$ and $A_2$ is coupled to an input port of a register 17. Clock signal CT5 causes, in each period T, a corresponding word of signal $A_{12}$ to be stored in register 17. A signal ST2 at an output port of register 17 contains the stored word of signal $A_{12}$. Similarly, sum signal $A_{12}$ is coupled to an input port of a register 14. Clock signal CT2 causes, in each period T in which clock signal CT2 is generated, a corresponding word of signal $A_{12}$ to be stored in register 14. A signal BK2 at an output port of register 14 contains the corresponding word of signal $A_{12}$ that is stored in register 14. Operation of controller 28 in the search mode is explained with the aid of FIGS. 2a and 2b.

FIG. 2a illustrates schematically the digitized values of signal $A_{IN}$ that correspond with the trailing edge of, for example, horizontal sync pulse $H_s$ of FIG. 1. Sync pulse $H_s$ includes flat portion FFP followed by transition portion TR that is then followed by flat portion FBP. FIG. 2b illustrates schematically the digitized values of signals $A_1$ and $A_2$ that correspond with signal $A_{IN}$. Similar numbers and symbols in FIGS. 1, 2a and 2b indicate similar items or functions.

In the first step of the operation in the search mode, controller 28 of FIG. 1 tests line 27a in each period T for detecting the occurrence of signal E. As can be seen in FIG. 2b, signal E of FIG. 1 is generated when a flat portion occurs in signal $A_{IN}$ of FIG. 2a such as portion FFP. After signal E of FIG. 1 is detected in each of, illustratively, at least five consecutive tests, controller 28 tests line 27a for detecting the first nonoccurrence of signal E. Signal E is no longer detected when a positive transition at a rate that exceeds the value L occurs in signal $A_{IN}$, or $A_{12}$, such as when transition portion TR of FIG. 2a occurs. When signal E of FIG. 1 is no longer detected, such as, for example, after time $T_{f1}$ of FIG. 2b, controller 28 of FIG. 1 terminates the generation of clock signal CT5 such that last value of signal $A_{12}$ that appears concurrently with signal E is stored in register 17. Signal E is indicative of a slow rate of change of signal $A_{IN}$. Thus, signal ST2 of register 17 remains at a level that is indicative of, illustratively, the level of flat portion FFP of signal $A_{IN}$ of FIG. 2a. When signal E of FIG. 1 is no longer detected, such as immediately after time $T_{f1}$ of FIG. 2b, controller 28 of FIG. 1 immediately generates a signal CT1 that resets, or initializes, a counter 41 to zero. After being initialized by signal CT1, counter 41 begins counting up, in each period T. Counter 41 generates a signal TRTO when, for example, a period of 32T has elapsed from the time signal CT1 initializes counter 41.

In the next step, controller 28 tests line 18a of FIG. 1 in each subsequent period T for detecting the occurrence of signal D. Signal D is indicative of an upramping positive transition in signal $A_{IN}$ of FIG. 2a at a rate of change, or slope, that exceeds the value K. The value K is substantially larger than the value L that is indicative of the slope of signal $A_{IN}$ when signal E was generated. Thus, signal D of FIG. 1 is generated at, for example, time $T_r$ of FIG. 2b. The occurrence of signal D in, illustratively, at least each of five consecutive tests is indicative of the occurrence of an upramping transition such as, for example, caused by portion TR of signal $A_{IN}$ of FIG. 2a.

In the last step of the search mode, controller 28 of FIG. 1 tests line 27a, in each period T that follows, for detecting signal E again. Signal E is now indicative of, illustratively, the occurrence of back porch portion FBP of signal $A_{IN}$ of FIG. 2a. When signal E of FIG. 1 is detected, such as, for example at time $T_{f2}$ of FIG. 2b, controller 28 of FIG. 1 terminates the generation of clock signal CT2 that stores signal $A_{12}$ in register 14.

In accordance with another aspect of the invention, signal BK2 of register 14 remains, after signal E is detected again, at a level that is indicative of, illustratively, the level of back porch portion FBP of signal $A_{IN}$ FIG. 2a.

In accordance with a further aspect of the invention, if the sequence of tests, that was described above, that terminates at, for example, time $T_{f2}$ of FIG. 2b, occurs before signal TRTO of counter 41 of FIG. 1 is generated, in that it occurs within the period of 32T from the time signal CT1 is generated, the corresponding part waveform of signal $A_{IN}$ has a waveform pattern that is substantially similar in characteristic to that of the trailing edge of a given sync pulse $H_s$. It should be understood that because signals $A_1$ and $A_2$ are low-pass filtered, a transition in signal $A_{IN}$ that occurs after, for example, time $T_{f1}$ of FIG. 2b that is not similar to the trailing edge of pulse $H_s$, will cause signal TRTO to be generated. A search mode at the end of which the pattern is recognized is referred to herein as the successful search mode. In contrast, if signal TRTO of counter 41 is generated prior to the completion of such sequence, controller 28 begins operating at the first step of the search mode by testing, as described before, line 27a for detecting the occurrence of five consecutive tests in which signal E occurs.

Signals ST2 and BK2 are coupled to corresponding input ports of a register 16. When controller 28 generates a clock signal CT4, both signals ST2 and BK2 are stored in register 16 to form a signal ST1 and a signal BK1, respectively, at corresponding output ports of register 16. Similarly, signals ST1 and BK1 are coupled to corresponding input ports of a register 15. When controller 28 generates a clock signal CT3, both signals ST1 and BK1 are stored in register 15 to form sync tip signal ST and back porch signal BK, respectively, at corresponding output ports of register 15. Signals ST and BK are summed in summer 21 for generating slice level signal SL, as described before. Thus, signals ST2 and BK2 may be stored, via register 16, in register 15 to form signals ST and BK, respectively.

Signal CT3 is also coupled to an input terminal 40b of a flip-flop 40. When signal CT3 is applied to terminal 40b, flip-flop 40 is caused to be at a "RESET" state such that an output signal ST1VD of flip-flop 40 is at a logical "FALSE" state. Clock signal CT4 that is used for storing signals ST2 and BK2 in register 16 is also coupled to an input terminal 40a of flip-flop 40. Signal CT4 causes flip-flop 40 to be at a "SET" state to provide signal ST1VD at a logical "TRUE" state. Signal ST1VD at logical "TRUE" state is indicative of the fact that signals ST1 and BK1 of register 16 have not yet been transferred to register 15; whereas, signal ST1VD at a logical "FALSE" state indicates that these signals have been transferred.

Output signals ST, ST1 and ST2 are coupled to a comparator 22 that generates a signal F, on a line 22a, when signal ST is smaller than or equal to signal ST1. A signal G of comparator 22 is generated on a line 22b when signal ST1 is smaller than or equal to signal ST2. Signals F, G and ST1VD, are coupled to corresponding input terminals of controller 28 for controlling the operation in a sync processing mode that immediately follows the corresponding successful search mode. The operation in the sync processing mode is described in detail in U.S. Pat. Application Ser. No. 06/857,320 filed Apr. 30, 1986, entitled a SYNC SEPARATOR WITH PERIODIC UPDATING, in the names of A. Balaban et al, filed concurrently herewith.

After the occurrence of the successful search mode, in which the pattern was recognized in signal $A_{IN}$, controller 28 processes signals ST2 and BK2 for establishing the corresponding values of signal ST1, BK1, ST, BK, and SL, as described later on. After establishing such values, operation in the search mode resumes at the first step, as described before.

At the end of each successful search mode, output signal ST2 of register 17 contains the average value of the part of signal $A_{IN}$ that corresponds with, illustratively, flat portion FFP of FIG. 2a. Similarly, output signal BK2 of register 14 of FIG. 1 contains the average value of the part of signal $A_{IN}$ that corresponds with, illustratively, flat portion FBP of FIG. 2a.

If signal ST2 at the end of the corresponding successful search mode is smaller than signal ST, signal ST2 is immediately stored in register 15 for updating signal ST. Such updating of signal ST is justified because it is likely that such successful search mode was caused by the occurrence of sync pulse $H_s$ and not by a signal transition in another part of signal $A_{IN}$ such as during the active video interval. After signal ST is updated, operation at the first step of the search mode is resumed, as described before.

Assume a situation in which during an interval $T_{to}$, having a duration that is, illustratively, slightly longer than a horizontal interval H, following the last time signal ST has been updated, one or more successful search modes operations occur. Assume further that at the end of each such successful search mode, the corresponding level of signal ST2 was higher than that of signal ST.

When the last mentioned situation occurs, the lowest level of signal ST2 obtained at the end of a corresponding successful search mode that occurs during interval $T_{to}$ is stored in register 15. Such lowest level of signal ST2 is stored at the end of interval $T_{to}$ in order to update signal ST. Typically, the level of signal ST2 that corresponds with sync tip portion FFP of sync pulse $H_s$ is lower than that of signal ST2 that does not correspond with portion FFP, even when signal $A_{IN}$ is distorted or accompanied by a moderate level of noise. Consequently, in the typical case, signal ST2 resulted from a transition that occurs during, for example, the active video interval of a given video line of signal $A_{IN}$, advantageously, will not affect signal ST.

A first and a second hypothetical situation demonstrate the ways signals ST, BK and SL are updated at the end of the corresponding operation in the successful search mode. The first hypothetical situation occurs when at the end of a given successful search mode, signal ST1VD is at logical "FALSE" state, indicating that signals ST1 and BK1 of registers 16 have already been stored in, or transferred to, register 15. In this case, signals ST2 and BK2 are stored by signal CT4 in register 16 to form updated signals ST1 and BK1, respectively; simultaneously, flip-flop 40 is set by signal CT4, causing signal STIVD to be at the logical "TRUE" state to indicate that signals ST1 and BKl contain information that has not been transferred yet to register 15. If signal ST1, now being equal to signal ST2, is smaller than signal ST, updated signals ST1 and BK1 are stored in register 15 by signal CT3. Thus, when signal ST2 of the newly received sync pulse $H_s$ is at a level that is lower than that of signal ST, signal ST2 and the associated signal BK2 are transferred, via register 16, to register 15 to form updated signals ST and BK, respectively, and operation begins at the first step of the subsequent search mode, as described before.

Controller 28 determines that signal ST2, now being equal to signal ST1, is smaller than signal ST by testing line 22a for detecting the absence of signal F. Because signal CT3 was generated in the course of storing signals ST1 and BK1 in register 15, output signal ST1VD of flip-flop 40 returns to the logical "FALSE" state to indicate that signals ST1 and BK1 of register 16 have already been stored in register 15.

If signal ST is smaller than or equal to signal ST1, signals ST1 and BK1 of register 16 are not immediately transferred to register 15 and signal ST1VD remains at the logical "TRUE" state. Thereafter, operation begins at the first step of the subsequent search mode.

A second hypothetical situation occurs when, prior to, for example, the first step of a given successful search mode, signals ST1 and BK1 have not been stored in, or transfer to, register 15, as indicated by signal ST1VD being at the "TRUE" state. If, signal ST2, at the end of the such successful search mode, is larger than or equal to signal ST1, signals ST2 and BK2 will not be stored in register 16; consequently signals ST1 and BK1 will remain unchanged. The result is that signal ST1 remains equal to the lowest value of signal ST2 obtained since the last time signal ST has been updated. On the other hand, if signal ST2, at the end of such successful search mode, is at a level that is lower than that of signal ST1, signals ST2 BK2 are stored in register 16 for updating signals ST1 and BK1, respectively. Again, the result is that signal ST1 is equal to the lowest value of signal ST2 obtained since the last time signal ST has been updated.

After signal ST2 is stored in register 16, the new value of signal ST1 is further compared with signal ST. In the same way discussed before, if signal ST is at a level that is lower than that of signal ST1, signal ST remains unchanged and signal ST1VD remains at logical "TRUE" state, for the reasons discussed before. Thereafter, operation begins at the first step of the subsequent search mode. However, if signal ST1 is at a level that is lower than that of signal ST, signal ST1 and BK1 are stored in register 15 to form updated sync tip signal ST and back porch signal BK, respectively. Signal CT3 that causes signals ST1 and BK1 to be stored in register 15, also causes signal ST1VD to assume the logical "FALSE" state. Thereafter, operation begins at the first step of the subsequent search mode.

Signal CT3 that supplies the clock signal to register 15 is also coupled to an input terminal 30b of a time-out counter 30. Signal CT3 resets, or initializes, counter 30 to zero each time signals ST1 and BK1 are stored in register 15. Counter 30 counts up from zero immediately after signal CT3 is applied. If signal CT3 does not occur again within time-out interval $T_{to}$ that is, illustratively, slightly longer than a horizontal line period H, and that occurs after the last time signals ST and BK have been updated, counter 30 generates a time-out signal TO at a terminal 30a. If signals ST and BK have not been updated within an interval that is equal to period H, it is assumed that the lowest level of signal ST1 within such interval has been caused by portion FFP of sync pulse $H_s$. Signal TO that is coupled to a corresponding input terminal of controller 28 is indicative of the fact that signals ST and BK have not been updated within, for example, the immediately preceding horizontal period H. After signal TO occurs, controller 28 generates signal CT3 that stores signals ST1 and BK1 of register 16 in register 15 for updating signals ST and BK, respectively. Signals ST and BK are updated in order to track or follow the levels of portions FFP and FBP, respectively, of signal $H_s$. In this way, slice level signal SL is established at the desired level even when signal 100 is distorted by, for example, airplane flutter. Thereafter, operation begins at the first step of the subsequent search mode.

Interval $T_{t0}$ that determines the maximum length of time between instants in which slice level signal SL is updated is predetermined, or known in advance, at the beginning time of interval $T_{t0}$ and is controlled independently of the amplitude of sync pulse $H_s$. The beginning time of each interval $T_{tO}$ occurs, for example, at the time signal SL has been lastly updated. In contrast, in some prior art circuits such maximum length of time between the instants in which the slice level signal is updated may be a function of, for example, the amplitude of the sync pulse.

As described before, signal ST1 that is stored in register 16 is equal to the lowest value of signal ST2 that has occurred, at the end of the corresponding successful search mode, since the last time signals ST and BK have been updated. After signal CT3 is generated for updating signals ST and BK, signal ST1VD is at the logical "FALSE" state and counter 30 begins counting up again from zero for beginning a new period.

FIGS. 3a–3c illustrate waveforms useful in explaining the operation of separator 200 of FIG. 1 after the end of the corresponding operation in the successful search mode. Similar numbers and symbols in FIGS. 1, 2a–2b and 3a–3b indicate similar items or functions.

In the example of FIG. 3a, signal $A_{IN}$ includes sync tip portions FFP having levels, respectively, that are different in correspondingly different sync pulses $H_s$. Such variations in signal $A_{IN}$ may be caused by, for example, a noise related disturbance or airplane flutter. Signal $A_{IN}$ includes a sync pulse $H_{s(1)}$ has sync tip portion $FFP_{(1)}$, causing signal $ST2_{(1)}$ to be at a level that is lower, during the occurrence of pulse $H_{s(1)}$, than that of sync tip signal ST. A second sync pulse $H_{s(2)}$ of signal $A_{IN}$ has sync tip portion $FFP_{(2)}$ causing signal $ST2_{(2)}$ to be at a higher level than that of slice level signal SL, during the occurrence of pulse $H_{s(2)}$. Sync pulse $H_{s(3)}$ has sync tip portion $FFP_{(3)}$, causing signal $ST_{(3)}$ to be at a lower level than that of sync tip signal ST, during the occurrence of pulse $H_{s(3)}$. The waveform of signal $A_{IN}$ shows an example in which the AGC loop of a television receiver, not shown in the FIGURES, is not capable of tracking fast changes in sync tip portions FFP of signal $A_{IN}$ of FIG. 3a. Had the AGC loop been able to track the fast changes in signal $A_{IN}$, portions $FFP_{(1)}$, $FFP_{(2)}$ and $FFP_{(3)}$ would have been at substantially the same level.

FIG. 3b illustrates schematically an example of the count number, or state, of counter 30 of FIG. 1. The count number of counter 30, shown schematically in FIG. 3b as an upramping signal, increases until signal CT3 of FIG. 1 is generated. When signal CT3 is generated, the count number becomes zero. Signal TO is generated if the count number has reached a predetermined value, occurring after time-out interval $T_{to}$ of FIG. 3a that is, illustratively, slightly longer than period H, has elapsed since the last time signals ST and BK have been updated.

At time $t_1$ of FIG. 3a, after the predetermined pattern is recognized in the waveform of pulse $H_{s(1)}$, signal $ST2_{(1)}$ that corresponds with the level of portion FFP $_{(1)}$ is at a lower level than that of signal ST. Signal $ST2_{(1)}$ and the corresponding signal $BK2_{(1)}$ are then transferred to register 15 via register 16 of FIG. 1 for updating signals ST and BK, respectively, to generate a new level for slice level signal SL. Counter 30 is reset to a count number that is equal to zero. At time $t_2$ of FIG. 3a, after the predetermined pattern is recognized in pulse $H_{s(2)}$, signal $ST2_{(2)}$ that is at a level higher than that of signal ST, and the corresponding signal $BK_{(2)}$, are transferred to, or stored in, register 16 of FIG. 1. Signals ST, BK and SL, however, are not updated at this time. At time $t_3$ of FIG. 3b, time-out signal TO of FIG. 1 is generated, because signals ST and BK have not been updated in the preceding interval $T_{to}$. When signal TO occurs, signal ST1 and the corresponding signal BK1 of register 16 are stored in register 15 to form updated signal ST. At time $t_4$ of FIG. 3a, signal $ST2_{(3)}$ and the corresponding signal $BK2_{(3)}$ are stored in register 15, via register 16 of FIG. 1, so as to update signals ST, BK and SL.

The example of FIG. 3a shows that even when the AGC loop, not shown in the FIGURES, is not capable of tracking the level of tip portion FFP of sync pulse $H_s$ of signal $A_{IN}$, signal ST, of FIG. 3a is, advantageously, capable of tracking the level of sync tip portion FFP; likewise, signal BK is, advantageously, capable of following the level of back porch portion FBP. Advantageously, even when the amplitude of sync pulse $H_s$ varies significantly, slice level signal SL is automatically established at the mid-range between portions FBP and FFP.

FIG. 3c illustrates separated sync signals SSP of sync signal 100a that are separated by comparator 20 of FIG. 1 and that correspond with signal $A_{IN}$ of FIG. 3a. Because flat portion $FFP_{(2)}$ of sync pulse $H_{s(2)}$ is higher than slice level signal SL, no separated sync signal SSP occurs during the occurrence of pulse $H_{s(2)}$. However, the next signal $SSP_{(3)}$, does advantageously, occur. Thus, when a fast change in signal $A_{IN}$ occurs, slice level signal SL of FIG. 1 is, advantageously, capable of tracking such fast change even when the AGC loop is not capable of doing so.

It should be understood that signals ST and BK of FIG. 1 are also properly updated during vertical blanking because, in NTSC, horizontal rate pulse $H_s$ occurs also during each period H of the vertical blanking interval.

Operations of sync separator 200 of FIG. 1 that follow the occurrence of a given successful search mode and that result in updating slice level signal SL may be performed instead, following a well known mode of operation that is different from the successful search mode, described above, but that also identifies a waveform pattern that is similar in characteristic to that of a given valid sync pulse $H_s$. For example, such mode of operation may identify sync pulse $H_s$ by peak-detecting signal $A_{IN}$ to obtain the most extreme amplitude of signal $A_{IN}$ at the required polarity. Such most extreme amplitude may correspond with sync pulse $H_s$.

What is claimed:

1. A sync separator apparatus responsive to a video signal that contains synchronizing for generating from said video signal a synchronizing output signal that contains the synchronizing information, comprising:
   first means responsive to said video signal for detecting the rate of change in said video signal to generate a first signal that is indicative of the rate of change occurring in said video signal;
   second means responsive to said first signal for generating a second signal when said first signal is indicative of the occurrence of a first predetermined rate of change; and
   means responsive to said video signal and to said second signal for generating said synchronizing output signal.

2. An apparatus according to claim 1 wherein said first means comprises a delay means for delaying said video signal and means responsive to said video signal and said delayed video signal for generating said first signal in accordance with a difference therebetween.

3. An apparatus according to claim 1 wherein said second means comprises an absolute value converter responsive to said first signal for generating a signal that is indicative of the absolute value of said first signal.

4. An apparatus according to claim 1 wherein said second means generates said second signal when an absolute value of said first signal is smaller than a first predetermined value that is indicative of a corresponding flat portion in the waveform of said video signal.

5. An apparatus according to claim 4 further comprising means responsive to said first signal for generating therefrom a third signal that is indicative of the occurrence of a transition edge in said video signal when the level of said first signal is substantially larger than said first predetermined value, wherein said output signal generating means is responsive to said third signal for generating in accordance therewith said output signal.

6. An apparatus according to claim 1 wherein said second means generates said second signal when the first predetermined rate of change is indicative of the occurrence of a transition edge of a given sync pulse of said video signal.

7. An apparatus according to claim 6 wherein said second signal is indicative of the occurrence of a trailing edge of said sync pulse.

8. An apparatus according to claim 1 wherein said output signal generating means comprises means responsive to said second signal for generating a signal that is indicative of the level of a portion of a given sync pulse of said video signal.

9. An apparatus according to claim 8 wherein said signal that is indicative of the level of said portion of said given sync pulse is indicative of the level of a tip portion thereof.

10. An apparatus according to claim 9 wherein said output signal generating means further comprises means responsive to said second signal for generating a signal that is indicative of the level of a back porch portion of said sync pulse.

11. An apparatus according to claim 10 wherein said output signal generating means further comprises, means responsive to said signals that are indicative of the levels of said tip and back porch portions, respectively, for generating, in accordance with a sum thereof, a slice level indicative signal and wherein said output signal generating means generates said output signal in accordance with said slice level indicative signal.

12. An apparatus according to claim 9 further comprising first memory responsive to said tip portion indicative signal that stores said tip portion indicative signal at least until after the occurrence of a sync pulse that follows said given sync pulse, and means responsive to a tip portion of said following sync pulse and to the signal that is stored in said first memory for generating a first control signal that is coupled to said first memory and that causes the level of said tip portion of said following sync pulse to be stored in said first memory in substitution for the signal that is stored therein.

13. An apparatus according to claim 12 wherein said first control signal generating means generates said first control signal that causes said tip portion of said following sync pulse to be stored in said first memory if the level of said tip portion of said given sync pulse is closer than that of said tip portion of said following sync pulse to the level of a part of said video signal occurring in an active video interval of said video signal.

14. An apparatus according to claim 12 further comprising a second memory responsive to the signal that is stored in said first memory for storing in said second memory a signal that is related to the signal that is stored in said first memory to provide in accordance with the signal that is stored in said second memory a slice level indicative signal, wherein said output signal generating means generates said output signal in accordance with said slice level indicative signal.

15. An apparatus according to claim 14 further comprising means responsive to the signals that are stored in said first and second memories for generating, in accordance with a difference thereof, a second control signal that controls the storing operation of said second memory.

16. An apparatus according to claim 15 wherein said second control signal causes the signal that is stored in said first memory to be stored in said second memory in substitution for the signal that is stored therein.

17. An apparatus according to claim 15 further comprising means responsive to said second control signal for generating a time-out indicative signal after a corresponding time-out interval has elapsed since the last time said second control signal was generated.

18. An apparatus according to claim 17 wherein said second control signal generating means generates said second control signal if the difference between the signals that are stored in said first and second memories is at a first polarity, and wherein said second control signal generating means is responsive to said time-out indicative signal for generating said second control signal upon the occurrence of said time-out indicative signal, provided the difference between the signals that are stored in said first and second memories is at the opposite polarity.

19. A sync separator apparatus responsive to a video signal that contains synchronizing for generating from said video signal an output signal that contains a synchronizing information, comprising:

means responsive to said video signal for generating a first signal that is indicative of a first rate of change therein, said first signal occurring when the rate of change of said video signal is similar to that in a tip portion and a porch portion of a valid sync pulse;

means responsive to said video signal for generating a second signal that is indicative of a higher rate of change therein, said second signal occurring when said video signal has a rate of change that is similar to that in an edge portion of said valid sync pulse;

means responsive to said first and second signals for searching for the occurrence of a first portion of said video signal having a rate of change that is similar to that in one of said tip and porch portions followed by a second portion having a rate of change that is similar to that in said edge portion that is then followed by a third portion having a rate of change that is similar to that in the other one of said tip and porch portions;

means coupled to said searching means for generating a third signal that is updated after the sequence of said first, second and third portions is detected, said third signal containing information of the level of at least one of said first, second and third portions; and means responsive to said video signal and to said third signal for generating said output signal.

20. An apparatus according to claim 19 further comprising means responsive to said first and second signals for generating a timing signal when a predetermined interval has elapsed from the detection of said first portion without detection of said third portion and wherein said third signal generating means is responsive to said timing signal for preventing the updating of said third signal to cause said searching means to begin again the search for the occurrence of said first, second and third portions.

21. An apparatus according to claim 19 wherein said porch portion comprises the back porch of said valid sync pulse and wherein said edge portion comprises the trailing edge of said valid sync pulse.

* * * * *